(12) United States Patent
Akiyama (10) Patent No.: US 7,185,991 B2
(45) Date of Patent: Mar. 6, 2007

(54) PROJECTOR WITH ANAMORPHIC OPTICAL SYSTEM

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 11/002,438

(22) Filed: Dec. 3, 2004

(65) Prior Publication Data

US 2005/0134812 A1 Jun. 23, 2005

(30) Foreign Application Priority Data

Dec. 3, 2003 (JP) ............................. 2003-404484

(51) Int. Cl.
*G03B 21/20* (2006.01)
*G03B 21/26* (2006.01)

(52) U.S. Cl. ........................................ 353/102; 353/30

(58) Field of Classification Search .................. 353/30, 353/102; 359/362
See application file for complete search history.

(56) References Cited

U.S. PATENT DOCUMENTS

| | | | | |
|---|---|---|---|---|
| 5,479,065 A * | 12/1995 | Sugimoto et al. | ........... | 313/113 |
| 6,594,090 B2 * | 7/2003 | Kruschwitz et al. | ........ | 359/707 |
| 2002/0140907 A1 * | 10/2002 | Fujimori | ...................... | 353/31 |
| 2003/0058411 A1 * | 3/2003 | Katsumata et al. | ........... | 353/31 |
| 2004/0032569 A1 * | 2/2004 | Takezawa et al. | ............ | 353/31 |

FOREIGN PATENT DOCUMENTS

JP A-2002-148712 5/2002

OTHER PUBLICATIONS

Merriam-webster's online dictionary (http://www.m-w.com/cgi-bin/dictionary?book=Dictionary&va=tablet).*
Kurita, "Picture Quality of Hold Type Display for Moving Images", *Technical Report of IEICE*, EID99-10 (Jun. 1999), pp. 55-60 (w/English translation).

* cited by examiner

*Primary Examiner*—Melissa Jan Koval
*Assistant Examiner*—Andrew Kong
(74) *Attorney, Agent, or Firm*—Oliff & Berridge, PLC (57) ABSTRACT

A projector capable of obtaining a smooth motion picture display of high quality without significantly reducing the utilization efficiency of light includes a light source device, a first lens array, a second lens array, a superimposing lens, a liquid crystal display device, and a projective optical system. The superimposing lens includes an anamorphic optical system to shape illumination luminous fluxes from the second lens array into illumination luminous fluxes having a cross-sectional shape that illuminates all the image formation regions of the liquid crystal display device in one direction along an X-axis direction, and a part of the image formation regions in the other direction along a Y-axis direction. The projector further includes a scanning device to scan the illumination luminous fluxes shaped by the superimposing lens in synchronism with a field frequency of the liquid crystal display device along the other direction on the image formation region.

15 Claims, 8 Drawing Sheets

| | SHAPE OF SMALL LENS OF FIRST LENS ARRAY | LIQUID CRYSTAL DISPLAY DEVICE | MAGNIFICATION FACTOR OF LIGHT EMITTING REGION TO SMALL LENS |
|---|---|---|---|
| SECOND EMBODIMENT | 3.3mm, 2.5mm, $L_1$ | 14.4mm, 10.8mm, 5.4mm, $L_2$, ASPECT RATIO 4:3 | LONGITUDINAL MAGNIFICATION 2.2 TIMES<br><br>TRANSVERSE MAGNIFICATION 4.4 TIMES |
| THIRD EMBODIMENT | 5.0mm, 2.9mm | 19.2mm, 10.8mm, 2.7mm, ASPECT RATIO 16:9 | LONGITUDINAL MAGNIFICATION 0.93 TIMES<br><br>TRANSVERSE MAGNIFICATION 3.8 TIMES |
| FOURTH EMBODIMENT | 5.0mm, 2.9mm | 19.2mm, 10.8mm, 5.4mm, ASPECT RATIO 16:9 | LONGITUDINAL MAGNIFICATION 1.9 TIMES<br><br>TRANSVERSE MAGNIFICATION 3.8 TIMES |
| FIFTH EMBODIMENT | 3.3mm, 1.3mm | 14.4mm, 10.8mm, 1.35mm, ASPECT RATIO 4:3 | LONGITUDINAL MAGNIFICATION 1.05 TIMES<br><br>TRANSVERSE MAGNIFICATION 4.4 TIMES |
| SIXTH EMBODIMENT | 3.3mm, 0.63mm | 14.4mm, 10.8mm, 0.68mm, ASPECT RATIO 4:3 | LONGITUDINAL MAGNIFICATION 1.05 TIMES<br><br>TRANSVERSE MAGNIFICATION 4.4 TIMES |

PROJECTOR WITH ANAMORPHIC OPTICAL SYSTEM

BACKGROUND

Exemplary embodiments of the present invention relate to a projector.

Figure 9:
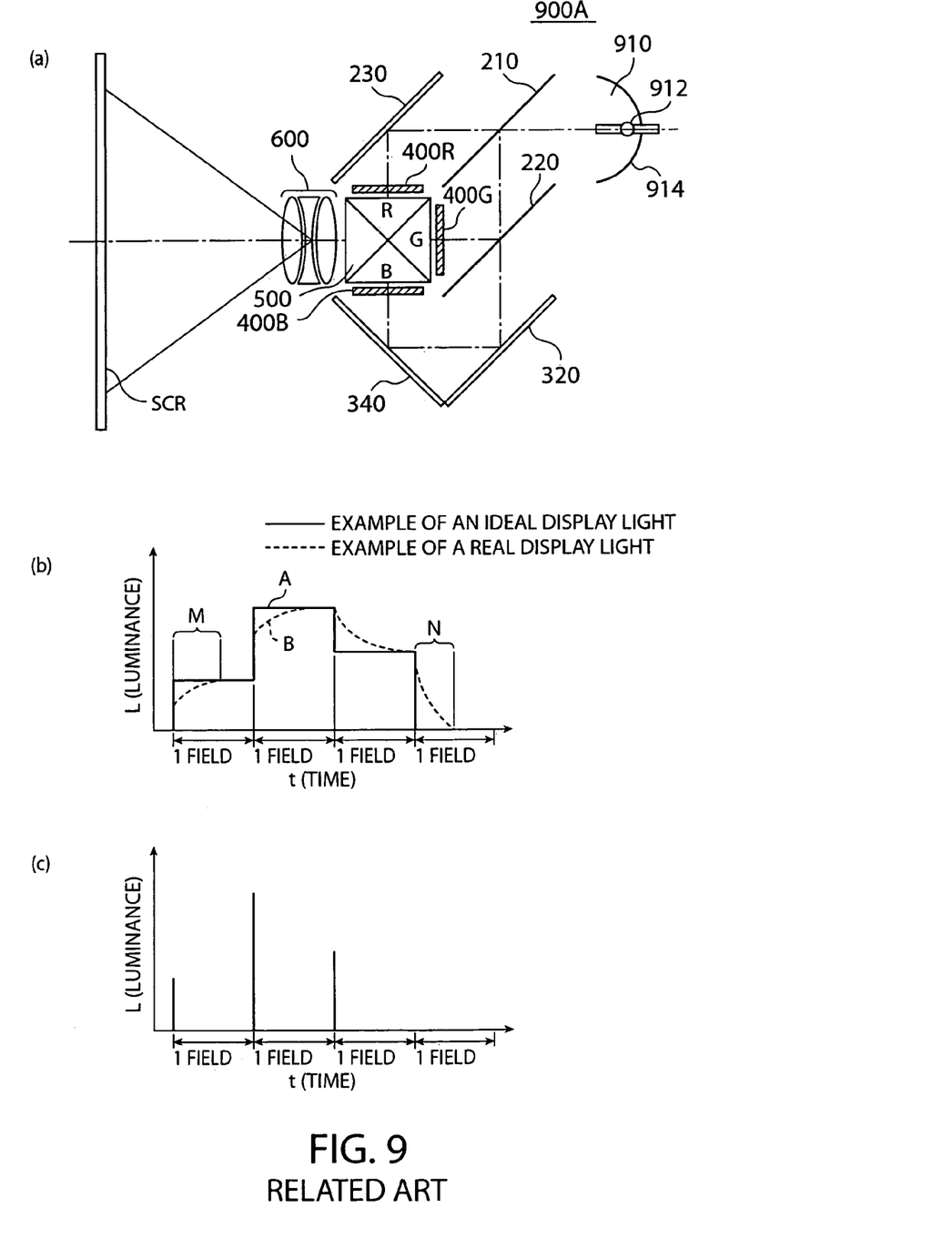
FIGS. 9(a)–9(c) are schematics illustrating a related art projector in an exemplary embodiment of the present invention.

FIGS. 9(a)–9(c) illustrate a projector in the related art. FIG. 9(a) shows an optical system of the conventional projector, and FIGS. 9(b) and 9(c) show problems of the related art projector.

In the projector 900A, liquid crystal display devices 400R, 400G, and 400B are used as electro-optical modulators, and are hold type display devices, each having luminance characteristics, as shown in FIG. 9(b). The liquid crystal display devices 400R, 400G, and 400B shown in FIG. 9(a) all have different luminance characteristics from those of CRTs that are impulse type display devices having luminance characteristics, as shown in FIG. 9(c), and the liquid crystal display devices 400R, 400G, and 400B shown in FIG. 9(a) cannot obtain a smooth motion picture display of high quality due to a tailing phenomenon (for example, refer to the tailing phenomenon described in "Picture Qulality of Hold Type Display for Moving Images", ELECTRONIC INFORMATION AND COMMUNCATION ACADEMY, EID 99-10, pages 55 to 60 (1999–06).

Figure 10:
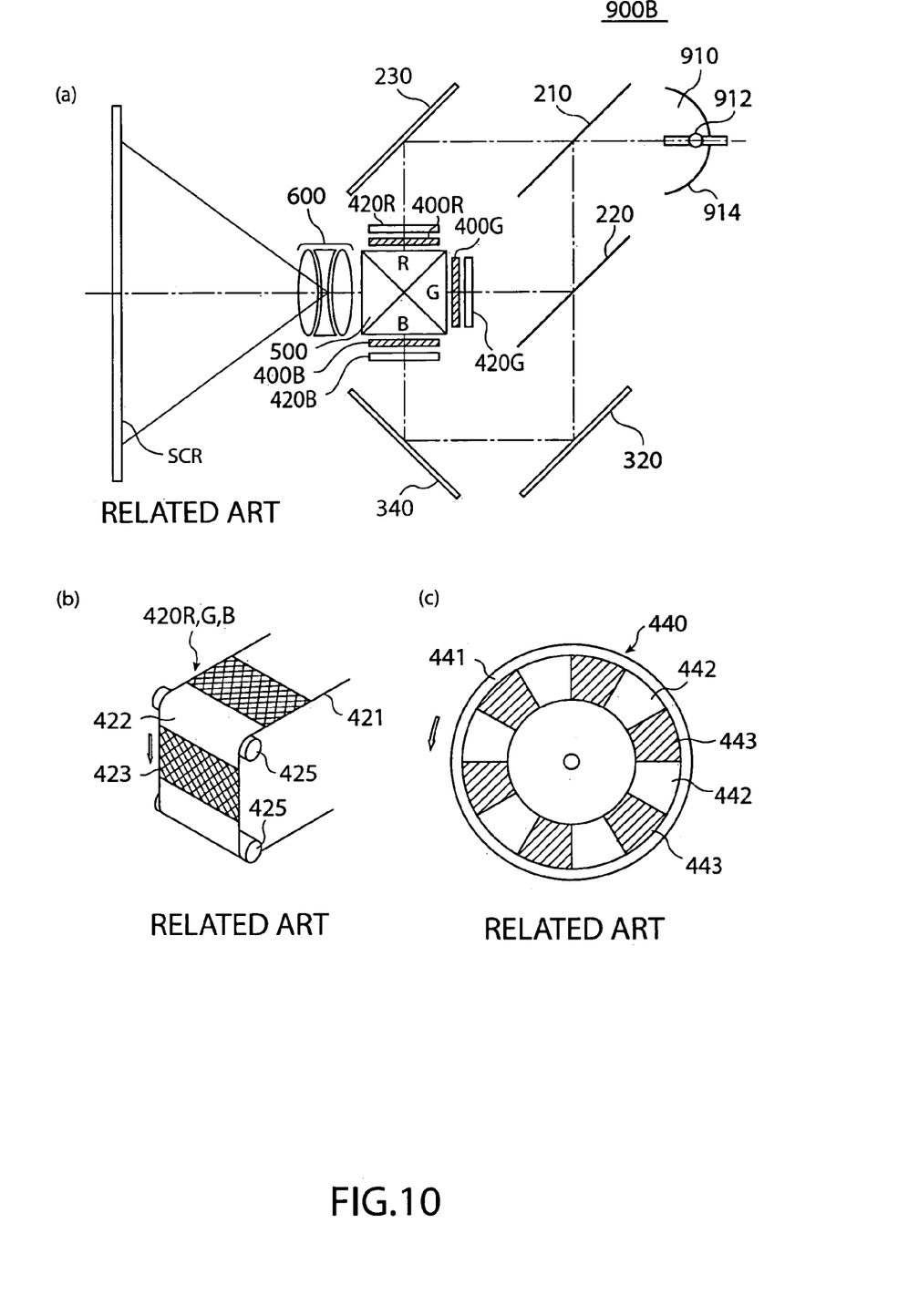
FIGS. 10(a)–10(c) are schematics illustrating another related art projector in an exemplary embodiment of the present invention.

FIGS. 10(a)–10(c) show another projector in the related art. FIG. 10(a) shows an optical system of another projector in the related art, and FIGS. 10(b) and 10(c) show optical shutters for another projector in the related art. In the projector 900B, as shown in FIG. 10(a), optical shutters 420R, 420G, and 420B are disposed at incident sides of liquid crystal display devices 400R, 400G, and 400B. Light is intermittently interrupted by the optical shutters 420R, 420G, and 420B, thereby addressing or solving the above-mentioned problem. That is, the projector 900B can obtain a smooth motion picture display of high quality by decreasing the tailing phenomenon (for example, see Japanese Unexamined Patent Application Publication No. 2002-148712 (FIGS. 1 to 7)).

SUMMARY

Accordingly, since the related art projector intermittently interrupts light by way of optical shutters, the related art projector has a problem in that utilization efficiency of light is significantly reduced.

Exemplary embodiments of the present invention address or solve the above-described problems in the related art. Exemplary embodiments of the present invention provide a projector that obtains a smooth motion picture display of high quality without significantly reducing the utilization efficiency of light.

(1) In an exemplary embodiment, a projector has a light source device to emit an illumination luminous flux substantially parallel to an illuminated region side; a first lens array having a plurality of small lenses to separate the illumination luminous flux from the light source device into a plurality of partial luminous fluxes; a second lens array having a plurality of small lenses corresponding to the plurality of small lenses of the first lens array; a superimposing lens to superimpose, respectively, partial luminous fluxes from the second lens array on an illuminated region; an electro-optical modulator to modulate the luminous fluxes superimposed by the superimposing lens according to image information; and a projective optical system to project the luminous fluxes modulated by the electro-optical modulator.

The superimposing lens includes an anamorphic optical system to shape the illumination luminous fluxes from the second lens array into illumination luminous fluxes having a cross-sectional shape so as to illuminate all of image formation regions of the electro-optical modulator in one of longitudinal and transverse direction, and a part of the image formation regions in the other direction thereof.

The projector further includes a scanning device to scan the illumination luminous fluxes shaped by the superimposing lens in synchronism with a field frequency of the electro-optical modulator along the other direction on the image formation region.

Since the projector, according to an exemplary embodiment, includes the scanning device to scan the illumination luminous fluxes shaped into a cross-sectional shape compressed into the other direction by the superimposing lens composed of the anamorphic optical system so as to illuminate all of an image formation region of the electro-optical modulator in one of longitudinal and transverse directions, and a part of the image formation region in the other direction thereof, in synchronism with a field frequency of the electro-optical modulator along the other direction on the image formation region, a projector is obtained in which light irradiated region and light non-irradiated region are sequentially and alternately scrolled in an image formation region of an electro-optical modulator. As a result, the projector can obtain a smooth motion picture display of high quality by decreasing the tail phenomenon.

Further, according to the projector of the exemplary embodiment, since an illumination luminous flux having the cross-sectional shape that is compressed into the other direction as described above is realized by a light shaping phenomenon of the superimposing lens composed of the anamorphic optical system, the illumination luminous flux from the illumination device is surely guided to an image formation region of an electro-optical modulator. The projector of the exemplary embodiment reduces or prevents the utilization efficiency of light from being significantly reduced.

Accordingly, the exemplary embodiment provides a projector that obtains a smooth motion picture display of high quality without significantly reducing the utilization efficiency of light, thereby obtaining or substantially obtaining the advantages of the exemplary embodiments discussed above and/or other advantages.

(2) In the projector of exemplary embodiment (1), the superimposing lens includes a first cylindrical lens having a bus line along the other direction and a second cylindrical lens having a bus line along the one direction, the first cylindrical lens constitutes a first tandem optical system group composed of a plurality of tandem optical systems together with the plurality of small lenses of the second lens array, the second cylindrical lens having a second tandem optical system group composed of a plurality of tandem optical systems together with the plurality of small lenses of the second lens array, and the first tandem optical system group and the second tandem optical system group have different magnifications from each other.

According to a construction of the projector described above, the illumination luminous flux having the cross-sectional shape compressed into the other direction is reasonably realized by the first and second tandem optical system groups.

(3) In the projector of exemplary embodiment (2) the magnification to an image formation region of the first tandem optical system group is set greater than that of the second tandem optical system group to an image formation region.

According to a construction of the projector described above, the illumination luminous flux having the cross-sectional shape compressed into the other direction is reasonably realized.

(4) In the projector of exemplary embodiments (2) or (3), preferably, the second cylindrical lens is provided to be with an illumination optical axis as a pivot axis.

According to a construction of the projector described above in the exemplary embodiments, during assembly of the projector, by adjusting the angle of each cylindrical lens to an illumination optical axis, the illumination luminous flux having the cross-sectional shape exactly compressed into the other direction may be easily obtained.

(5) In the projector of one of exemplary embodiments, (2) to (4), each of the first and second cylindrical lenses is a tablet. According to a construction of the projector described above, it is possible to reduce an aberration of each cylindrical lens. The construction improves the contrast between a light irradiated region and a light non-irradiated region on an image formation region of an electro-optical modulator and efficiently decreases a tailing phenomenon.

(6) In the projector of one of exemplary embodiments, (1) to (5), the scanning means includes a galvano-mirror or a polygon mirror.

According to a construction of the projector of the exemplary embodiments described above, the scanning device to scan an illumination luminous flux in synchronism with a field frequency of the electro-optical modulator is realized.

(7) In the projector of one of exemplary embodiments, (1) to (6), the light source device includes an ellipsoid reflector, and an arc tube having a light emitting center in the vicinity of a first focus of the ellipsoid reflector.

According to a construction of the projector of the exemplary embodiments described above, the light source device realizing a more compact optical device in comparison with a light source device using a paraboloid reflector can be realized.

(8) In the projector of one of exemplary embodiments (1) to (6), the light source device includes a paraboloid reflector and an arc tube having a light emitting center in the vicinity of a focus of the paraboloid reflector.

According to a construction of the projector of the exemplary embodiments described above, since it is possible to obtain a substantially parallel illumination luminous flux without using a collimating lens, the light source device realizes an optical device having a fewer number of components in comparison with a light source device using an ellipsoid reflector requiring a parallel lens.

(9) In the projector of exemplary embodiments (7) to (8) the arc tube is provided with a reflecting device to reflect a light emitted to an illuminated region side from the arc tube toward the ellipsoid reflector or the paraboloid reflector.

According to a construction of the projector of exemplary embodiments described above, since the light emitted to an illuminated region side from the arc tube is reflected toward the ellipsoid reflector and the ellipsoid reflector, there is no need to set a size of the ellipsoid reflector or the paraboloid reflector corresponding to a size to cover an illuminated region side end of the arc tube and the ellipsoid reflector or the paraboloid reflector is miniaturized, thereby causing miniaturization of the projector.

Further, using the ellipsoid reflector causes a focus angle of a beam focused to a second focus of the ellipsoid reflector from the ellipsoid reflector to be reduced. Furthermore, it is possible to reduce the size of all sorts of optical elements to be provided in a next stage and the size of the projector.

(10) In the projector of one of exemplary embodiments (1) to (9), a polarization converting element is further provided between the second lens array and the superimposing lens, to convert the illumination luminous fluxes from the second lens array into illumination luminous fluxes each having a polarization axis of a predetermined direction.

According to a construction of the projector of exemplary embodiments described above, since the illumination luminous flux having a polarizing axis of a predetermined direction can be irradiated to an image formation region of an electro-optical modulator, the projector may require the usage of an illumination luminous flux having a predetermined polarizing axis like a liquid crystal display device.

DETAILED DESCRIPTION OF EMBODIMENTS

Hereinafter, a projector according to exemplary embodiments of the present invention is explained based on embodiments illustrated with reference to the figures.

[First Exemplary embodiment]

Figure 1:
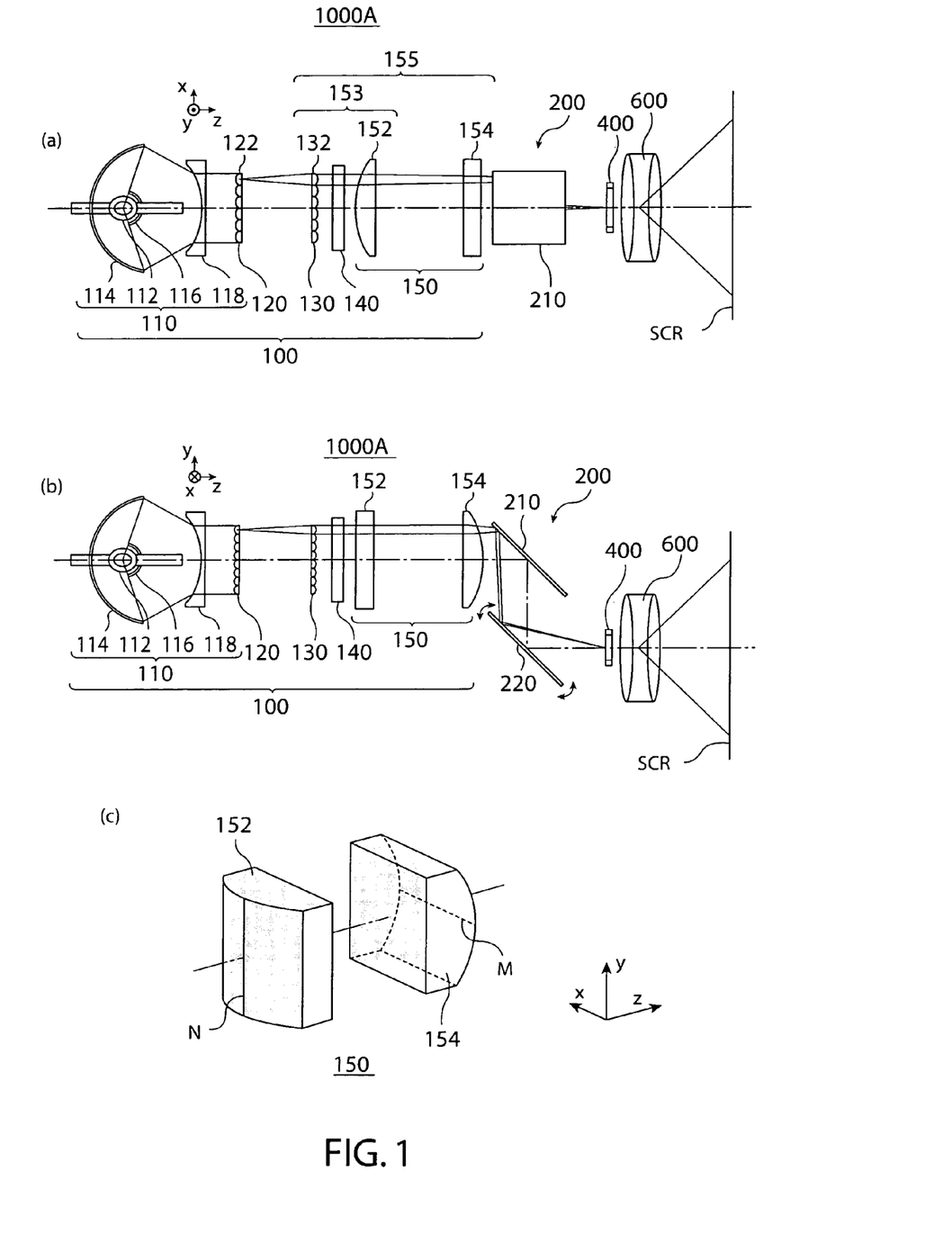
FIGS. 1(a)–1(c) are schematics showing an optical system of a projector according to a first exemplary embodiment of the present invention.
Figure 2:
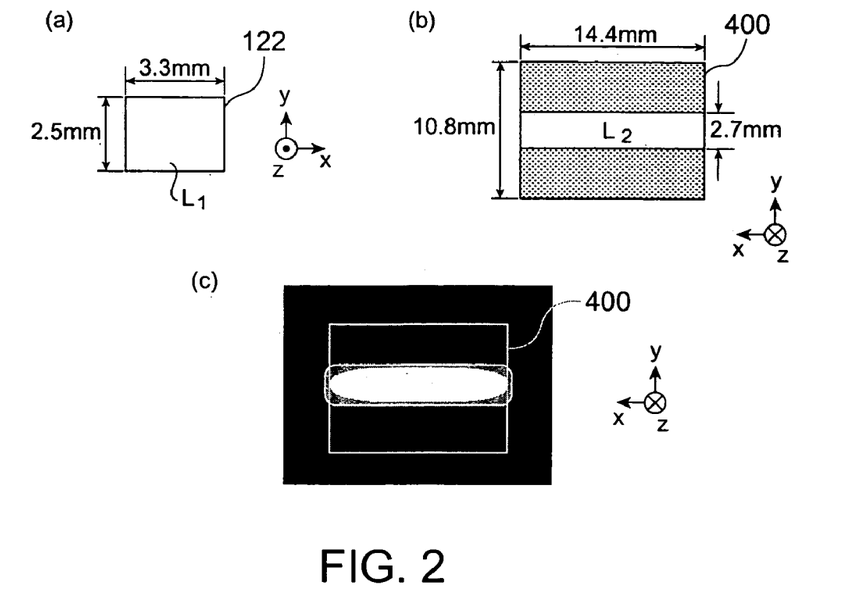
FIGS. 2(a)–2(c) are schematics illustrating an operation effect of a superimposing lens in an exemplary embodiment of the present invention.
Figure 3:
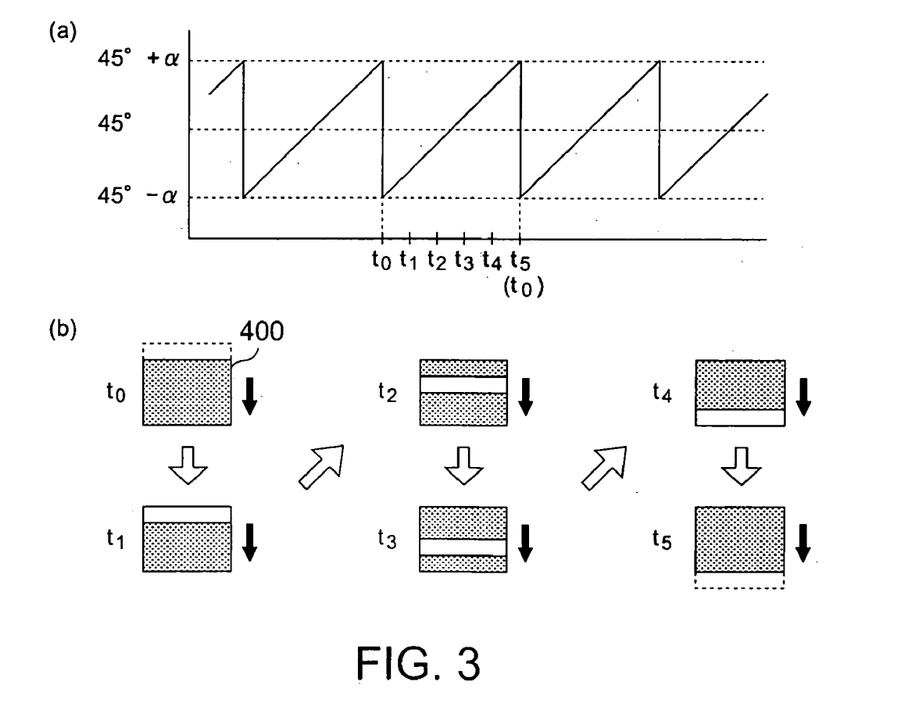
FIGS. 3(a) and 3(b) are schematics illustrating an operation effect of a galvano-mirror as a scanning device in an exemplary embodiment of the present invention.

FIGS. 1(a)–1(c) are schematics showing an optical system of a projector according to a first exemplary embodiment of the present invention. FIG. 1(a) is a plan view schematic of the optical system, FIG. 1(b) is a side view schematic of the optical system, and FIG. 1(c) is a perspective view schematic of a superimposing lens. FIGS. 2(a)–2(c) are schematics illustrating a functioning and effects of a superimposing lens. FIG. 2(a) is a schematic showing an illuminating state on a light emitting surface of a small lens of a first lens array, FIG. 2(b) is a schematic showing an illuminating state on a liquid crystal display device as an electro-optical modulator, and FIG. 2(c) is a schematic showing an illuminating state on a liquid crystal display device. FIGS. 3(a) and 3(b) are schematics illustrating an operation effect of a galvano-mirror as the scanning device. FIG. 3(a) is a schematic showing an operation of a galvano-mirror, and FIG. 3(b) is a schematic showing an illuminating state on a liquid crystal display device.

As shown in FIGS. 1(a)–1(c), a projector 1000A according to the first exemplary embodiment includes an illuminating device 100, a liquid crystal display device 400 as an electro-optical modulator for modulating an illumination luminous flux from the illumination device 100 in accordance with image information, and a projection optical system 600 for projecting the illumination luminous flux modulated by the liquid crystal display device 400.

As shown in FIGS. 1(a)–1(c), the illumination device 100 includes a light source device 110, a first lens array 120 having a plurality of small lenses 122 to separate the illumination luminous flux from the light source device 110 into a plurality of partial luminous fluxes, a second lens array 130 having a plurality of small lenses 132 corresponding to the plurality of small lenses 122 of the first lens array 120, and a superimposing lens 150 for superimposing respective partial luminous fluxes from the second lens array 130 at an illuminated region.

As shown in FIGS. 1(a) and 1(b), the light source device 110 includes an ellipsoid reflector 114, an arc tube 112 having a light emitting center in the vicinity of a first focus of the ellipsoid reflector 114, and a collimating lens 118 to convert the light flux from the ellipsoid reflector 114 into a parallel luminous flux. An auxiliary mirror 116 functioning as a reflecting device is provided at the arc tube 112 and reflects a light emitted to the illuminated region side from the arc tube 112 toward the ellipsoid reflector 114.

As shown in FIGS. 1(a) and 1(b), the superimposing lens 150 is composed of an anamorphic optical system to shape the illumination luminous fluxes from the second lens array 130 so as to illuminate all of an image formation regions of a liquid crystal display device 400 in one direction along an X-axis direction, and a part of the image formation regions in the other direction along a Y-axis direction. That is, the illumination luminous flux is compressed into the other direction in its cross-sectional shape by the anamorphic optical system.

As shown in FIGS. 1(a), 1(b), and 1(c), the superimposing lens 150 includes a first cylindrical lens 152 having a bus line N along the other direction and a second cylindrical lens 154 having a bus line M along the one direction. The first cylindrical lens 152 forms a first tandem optical system group 153 composed of a plurality of tandem optical systems together with the plurality of small lenses 132 of the second lens array 130, and the second cylindrical lens 154 forms a second tandem optical system group 155 composed of a plurality of tandem optical systems together with the plurality of small lenses 132 of the second lens array 130.

The first tandem optical system group 155 and the second tandem optical system group 155 have different magnifications to image formation regions from each other. In detail, as shown in FIGS. 2(a) and 2(b), the magnification of the first tandem optical system group 153 is 4.4 times (3.3 mm→14.4 mm), and the magnification of the second tandem optical system group 155 is 1.1 times (2.5 mm→2.7 mm).

For this reason, since the projector 1000A of the first exemplary embodiment includes the superimposing lens 150 as described above, as shown in FIGS. 2(b) and 2(c), the superimposing lens 150 reasonably and surely converts the illumination luminous fluxes from the second lens array 130 into illumination luminous fluxes $L_2$ so as to illuminate all of an image formation regions of a liquid crystal display device 400 in one direction along an X-axis direction, and onto a part of the image formation regions in the other direction along a Y-axis direction. That is, the illumination luminous flux is compressed into the other direction in its cross-sectional shape by the superimposing lens 150.

As shown in FIGS. 1(a) and 1(b), the projector 1000A according to the first exemplary embodiment further includes a scanning device 200 to scan an illumination luminous flux in synchronism with a field frequency of the liquid crystal display device 400 along a Y-axis on the image formation region. The scanning device 200 includes a reflecting mirror 210 and a galvano-mirror 220. The scanning device 200 scans an illumination luminous flux on the liquid crystal device 400 by rotating the galvano-mirror 220 as arrows shown in FIG. 1(b). As shown in FIG. 3(b), the galvano-mirror periodically rotates on the x-axis from at the angle of (45+α) to (45−α) degrees to the illumination optical axis illustrated by dashed line shown in FIGS. 1(a) and 1(b). The period of the rotation corresponds to the field frequency of the liquid crystal display 400.

Since a projector 1000A of the first exemplary embodiment includes the above-described scanning device 200, as shown in FIG. 3(b), in an image formation region of a liquid crystal display device 400, light irradiated region and light non-irradiated region are sequentially and alternately scrolled. Consequently, the tailing phenomenon decreases to obtain a projector having a smooth display of a high quality.

Furthermore, in accordance with the projector 1000A of the first exemplary embodiment, as described previously, since a light shaping phenomenon of the superimposing lens 150 comprised of the anamorphic optical system functions to realize the illumination luminous flux $L_2$ having the cross-sectional shape that is compressed into Y-axis direction as described above, the illumination luminous flux $L_1$ from the first lens array 120 is surely guided to an image formation region of a liquid crystal display device 400. It also prevents the utilization efficiency of light from being significantly reduced.

For this reason, the projector 1000A according the first exemplary embodiment provides a smooth motion picture display with a high quality without significantly reducing the utilization efficiency of light.

In the projector 1000A according the first exemplary embodiment, two cylindrical lenses 152 and 154 are provided to be rotated on the illumination optical axis as a pivot axis. The cylindrical lenses 152 and 154 are integrally formed. During assembling the projector, the angles of the cylindrical lenses 152 and 154 to the illumination optical axis are adjusted in the lump, which allows the illumination luminous flux having a cross-sectional shape exactly compressed into the other direction to be easily obtained.

In the projector 1000A according to the first exemplary embodiment, as described previously, the light source device 110 includes an ellipsoid reflector 114 and an arc tube 112 having a light emitting center in the vicinity of a first focus of the ellipsoid reflector 114.

For this reason, a more compact optical device can be realized in comparison with a light source device using a paraboloid reflector.

In the projector 1000A according to the first exemplary embodiment, although the light source device using the ellipsoid reflector is employed, the present exemplary embodiment is not limited thereto, a light source device emitting an illumination luminous flux substantially parallel with an illuminated region side may be employed in the same manner as above.

For example, a light source device using a paraboloid reflector may be used. In this case, since a substantially parallel illumination luminous flux can be obtained without using a collimating lens, the light source device using the paraboloid reflector can realize an optical device having the less number of components in comparison with the light source device using the ellipsoid reflector requiring the collimating lens.

In the projector 1000A according to the first exemplary embodiment, an auxiliary mirror 116 functioning as a reflecting device is provided at an arc tube 112, and reflects the light emitted to an illuminated region side from the arc tube 112 toward the ellipsoid reflector 114.

Since the light emitted to an illuminated region side from the arc tube 112 is reflected toward the ellipsoid reflector 114, there is no need to set a size of the ellipsoid reflector 114 corresponding to a size to cover an illuminated region side end of the arc tube 112 and the ellipsoid reflector 114 can be miniaturized, thereby causing miniaturization of the projector.

Further, miniaturization of the ellipsoid reflector 114 causes a focus angle of a beam focused to a second focus of the ellipsoid reflector 114 from the ellipsoid reflector 114 to be reduced. Furthermore, it is possible to further reduce the sizes of various optical elements to be provided in a next stage and the size of the projector.

In the projector 1000A according to the first exemplary embodiment, a polarization converting element 140 is further provided between the second lens array 130 and the superimposing lens 150. The polarization converting element converts an illumination luminous flux from the second lens array 130 into an illumination luminous flux having a polarizing axis of a predetermined direction. For this reason, since the polarization converting element 140 can irradiate the illumination luminous flux having a polarizing axis of a predetermined direction to an image formation region of a liquid crystal display device 400, this projector may require the usage of an illumination luminous flux having a predetermined polarizing axis like a liquid crystal display device and the like.

[First Exemplary Modification]

Figure 4:
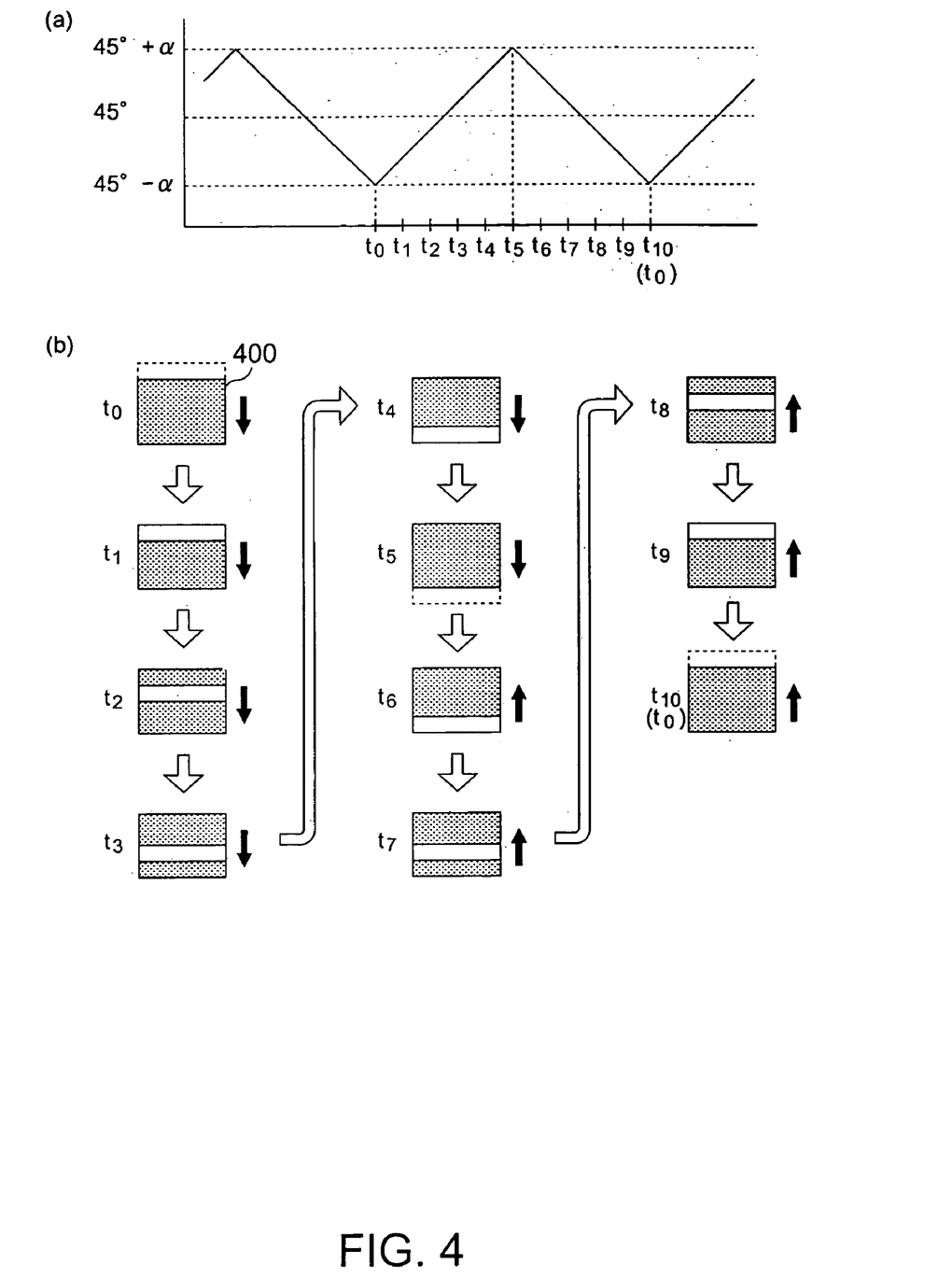
FIGS. 4(a) and 4(b) are schematics illustrating an operation effect of another galvano-mirror according to a first exemplary modification of the present invention.

In a projector according to a first exemplary modification, another movement of galvano-mirror shown in FIGS. 4(a) and 4(b) is substituted for the one shown in FIGS. 3(a) and 3(b).

FIGS. 4(a) and 4(b) are schematics illustrating an operation of galvano-mirror according to the first exemplary modification of the present invention. FIG. 4(a) is a schematic illustrating the movement of galvano-mirror, and FIG. 4(b) is a schematic showing an illuminated state on a liquid crystal display device.

In another galvano-mirror according to the first exemplary modification, as shown in FIG. 4(a), an operation of the galvano-mirror is different from that of the galvano-mirror 220 according to the first exemplary embodiment. The rotation of the galvano-mirror 220 according to the first exemplary embodiment is asymmetrically performed at clockwise and counterclockwise directions, whereas the rotation of galvano-mirror according to the first exemplary modification is symmetrically performed at clockwise and counterclockwise directions.

For this reason, when the another movement of galvano-mirror according to the first exemplary modification is used, as shown in FIG. 4(b), the galvano-mirror the illuminated state on the liquid crystal display device 400 in which light irradiated regions are repeated in upward and downward directions.

As described above, an operation of the galvano-mirror of a projector according to the first exemplary modification is different from that of the galvano-mirror 220 of the projector 1000A. However, a writing image into the liquid crystal display device 400 is performed in accordance with the operation of the galvano-mirror. Accordingly, a tailing phenomenon decreases to obtain a projector having a smooth motion picture display with high quality.

Further, in the projector according to the first exemplary modification, in the same manner as the case in the projector 1000A, since an illumination luminous flux having a cross-sectional shape compressed to a Y-axis direction is generated by a light shaping operation of a superimposing lens 150 composed of an anamorphic optical system, the illumination luminous flux from the second lens array 130 is surely guided to an image formation region of the liquid crystal display device 400. It prevents light utilization efficiency from being significantly reduced.

For this reason, the projector according to the first exemplary modification provides a smooth motion picture display of a high quality without significantly reducing light utilization efficiency.

[Second Exemplary Modification]

Figure 5:
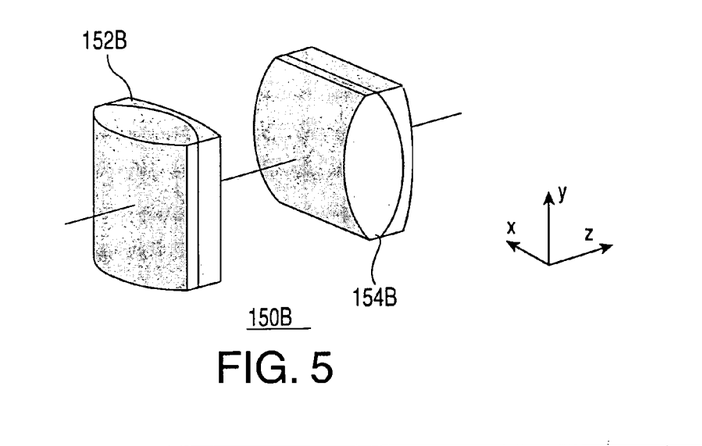
FIG. 5 is a perspective schematic showing another superimposing lens according to a second exemplary modification of the present invention.

In a projector according to a second exemplary modification, another superimposing lens 150B shown in FIG. 5 is substituted for a superimposing lens 150 of a projector 1000A. FIG. 5 is a perspective view of another superimposing lens according to a second exemplary modification of the present invention.

As shown in FIG. 5, another superimposing lens 150B according to the second exemplary modification uses cylindrical lenses 152B and 154B of a tablet as respective cylindrical lenses constituting the superimposing lens 150B.

The projector according to the second exemplary modification uses another superimposing lens 150B as described above to reduce the aberration of respective cylindrical lenses 152B and 154B. Further, it improves contrast between a light irradiated region and a light non-irradiated region on an image formation region of a liquid crystal display device 400 and efficiently decreases a tailing phenomenon.

[Second to Sixth Exemplary Embodiments]

Figure 6:
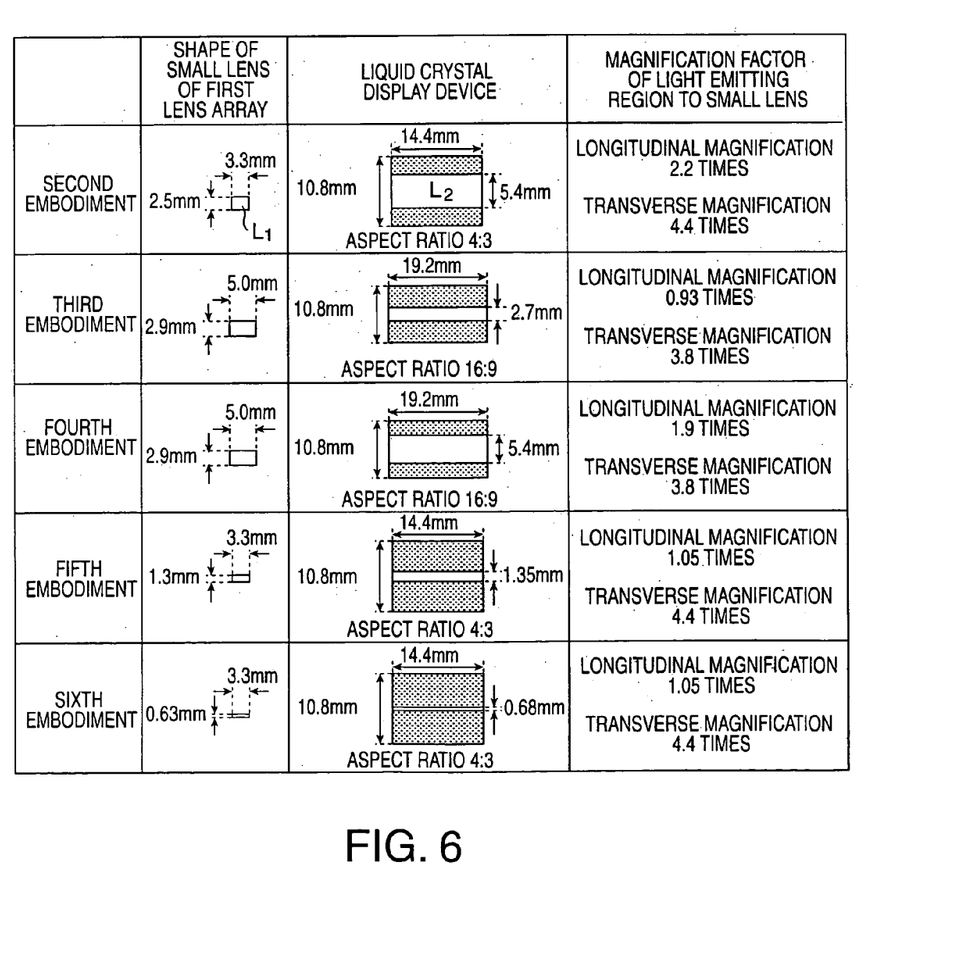
FIG. 6 is a schematic showing a magnification and a shape relationship between a shape of a small lens of a first lens array and a shape of an illuminating light flux on a liquid crystal display device.

FIG. 6 is a schematic showing a magnification and a shape relationship between a shape of an illumination luminous flux $L_1$ on a light emitting surface of a small lens of a first lens array and a shape of an illumination luminous flux $L_2$ on a liquid crystal display device in each projector according to second to sixth exemplary embodiments. As shown in FIG. 6, each projector according to the second to sixth exemplary embodiments changes at least one of a cross-sectional shape of a small lens 122 of a first lens array 120, a shape of an image formation region of a liquid crystal display device 400, and a magnification of a superimposing lens 150, in the projector 1000A according to the first exemplary embodiment.

In the projector according to the second exemplary embodiment, a cross-sectional shape of a small lens of a first lens array and a cross-sectional shape of a liquid crystal display device are identical to those of the projector 1000A according to the first exemplary embodiment. As shown in a first column of FIG. 6, a superimposing lens in the projector according to the second exemplary embodiment has a transverse image formation magnification (X-axis direction) of 4.4 times and a longitudinal image formation magnification (Y-axis direction) of 2.2 times. As a result, in the projector according to the second exemplary embodiment, the cross-sectional shape of an illumination luminous flux $L_2$ on a liquid crystal display device has an aspect ratio of width (X-axis direction): height (Y-axis direction)=8:3.

A cross-sectional shape of a small lens of a first lens array in the projector according to the third exemplary embodiment is different from that of the small lens 122 of the first lens array 120 in the projector 1000A according to the first exemplary embodiment, and has a height of 2.9 mm and a width of 5.0 mm. A cross-sectional shape of a liquid crystal display device in the projector according to the third exemplary embodiment is different from that of the projector according to the first or second exemplary embodiments, and has a wide shape having a height of 10.8 mm and a width of 19.2 mm. As shown in a second column of FIG. 6, a cross-sectional shape of a superimposing lens in the projector according to the third exemplary embodiment has a transverse image formation magnification (X-axis direction) of 3.8 times and a longitudinal image formation magnification (Y-axis direction) of 0.93 times. Accordingly, in the projector according to the third exemplary embodiment, the cross-sectional shape of an illumination luminous flux $L_2$ on a liquid crystal display device has an aspect ratio of width (X-axis direction): height (Y-axis direction)=64:9.

In the projector according to the fourth exemplary embodiment, a cross-sectional shape of a small lens of a first lens array and a cross-sectional shape of a liquid crystal display device are identical to those of the projector according to the third exemplary embodiment. As shown in a third column of FIG. 6, a superimposing lens in the projector according to the fourth exemplary embodiment has a transverse image formation magnification (X-axis direction) of 3.8 times and a longitudinal image formation magnification (Y-axis direction) of 1.9 times. As a result, in the projector according to the fourth exemplary embodiment, the cross-sectional shape of an illumination luminous flux $L_2$ on a liquid crystal display device has an aspect ratio of width (X-axis direction): height (Y-axis direction)=32:9.

A cross-sectional shape of a small lens of a first lens array in the projector according to the fifth exemplary embodiment is different from that of the small lens 122 of the first lens array 120 in the projector 1000A according to the first exemplary embodiment, and has a height of 1.3 mm and a width of 3.3 mm. A cross-sectional shape of a liquid crystal display device in the projector according to the fifth exemplary embodiment is identical with that of the projector according to the first or second exemplary embodiment. As shown in a fourth column of FIG. 6, a cross-sectional shape of a superimposing lens in the projector according to the fifth exemplary embodiment has a transverse image formation magnification (X-axis direction) of 4.4 times and a longitudinal image formation magnification (Y-axis direction) of 1.05 times. Consequently, in the projector according to the fifth exemplary embodiment, the cross-sectional shape of an illumination luminous flux $L_2$ on a liquid crystal display device has an aspect ratio of width (X-axis direction): height (Y-axis direction)=32:3.

A cross-sectional shape of a small lens of a first lens array in the projector according to the sixth exemplary embodiment is different from that of the small lens 122 of the first lens array 120 in the projector 1000A according to the first exemplary embodiment, and has a height of 0.63 mm and a width of 3.3 mm. A cross-sectional shape of a liquid crystal display device in the projector according to the sixth exemplary embodiment is identical to that of the projector according to the first, second, or fifth exemplary embodiments. As shown in a fifth column of FIG. 6, a cross-sectional shape of a superimposing lens in the projector according to the sixth exemplary embodiment has a transverse image formation magnification (X-axis direction) of 4.4 times and a longitudinal magnification (Y-axis direction) of 1.05 times. Accordingly, in the projector according to the sixth exemplary embodiment, the cross-sectional shape of an illumination luminous flux $L_2$ on a liquid crystal display device has an aspect ratio of width (X-axis direction): height (Y-axis direction)=64:3.

As mentioned above, each projector according to second to sixth exemplary embodiments changes at least one of a cross-sectional shape of a small lens 122 of a first lens array 120, a shape of an image formation region of a liquid crystal display device 400, and a magnification of a superimposing lens 150. However, in each projector according to second to sixth exemplary embodiments, by a superimposing lens composed of an anamorphic optical system, an illumination luminous flux is converted so as to illuminate all of an image formation regions of a liquid crystal display device in one direction along an X-axis direction and a part of the image formation regions in the other direction along a Y-axis direction, is irradiated onto the image formation regions of a liquid display device. That is, the illumination luminous flux is compressed into the other direction in its cross-sectional shape by the superimposing lens.

By scanning the above-mentioned illumination luminous flux with the scanning device in synchronism with a field frequency of the liquid crystal display device along a Y-axis on the image formation region, in an image formation region of a liquid crystal display device, light irradiated regions and light non-irradiated regions are sequentially and alternately scrolled. Consequently, the tailing phenomenon decreases to obtain a projector having a smooth display of a high quality.

Furthermore, in accordance with the projectors of the second to sixth exemplary embodiments, since an illumination luminous flux having the cross-sectional shape that is compressed into the other direction as described above is realized by a light shaping phenomenon of the superimposing lens composed of the anamorphic optical system, the illumination luminous flux from the second lens array is surely guided to an image formation region of a liquid crystal display device. It also prevents the utilization efficiency of light from being significantly reduced.

For this reason, each projector according the second to sixth exemplary embodiments provides a smooth motion picture display with high quality without largely reducing the utilization efficiency of light.

[Seventh Exemplary Embodiment]

Figure 7:
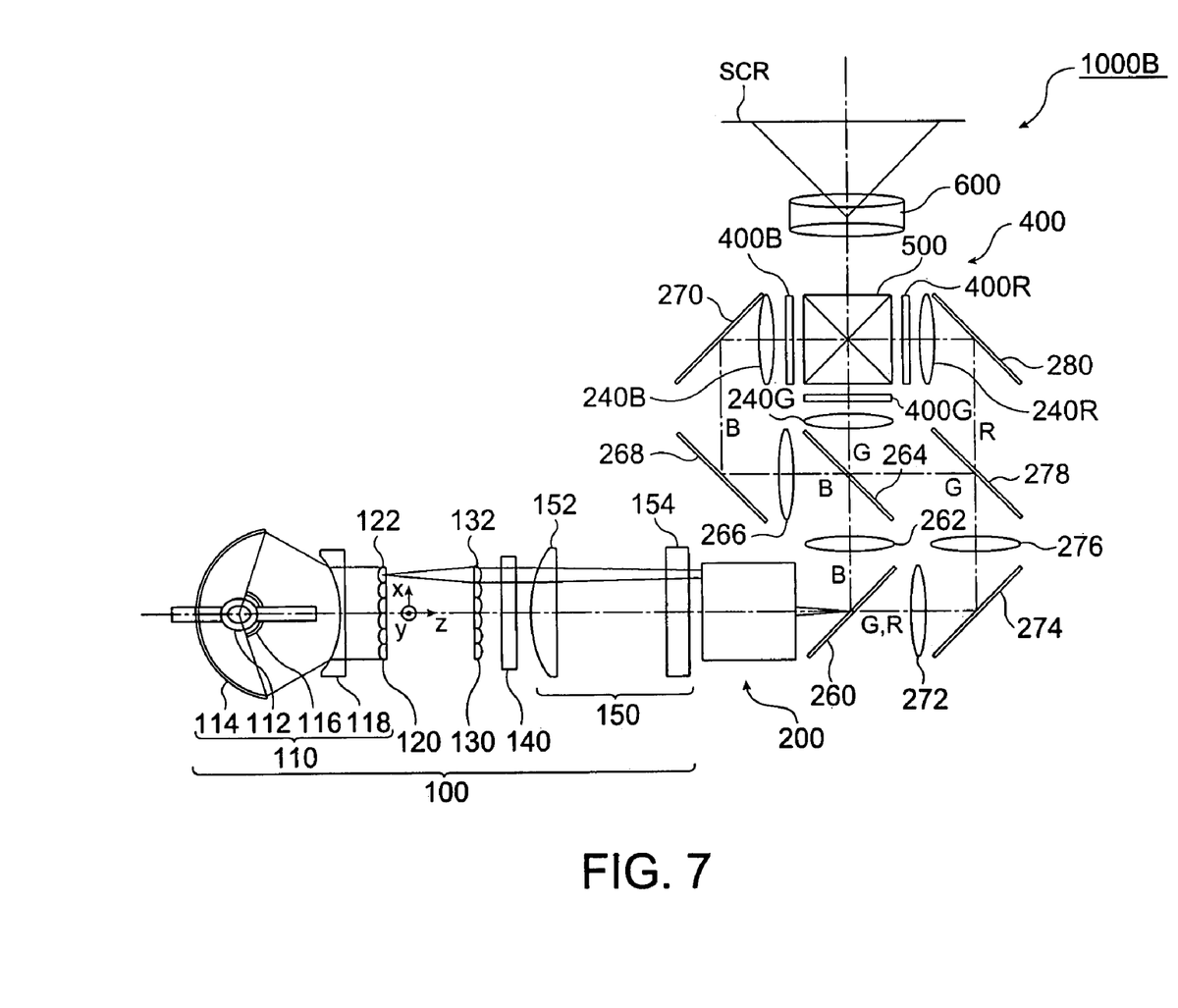
FIG. 7 is a schematic showing an optical system of a projector according to a seventh exemplary embodiment of the present invention.

FIG. 7 is a view showing an optical system of a projector according to a seventh exemplary embodiment of the present invention. As shown in FIG. 7, the projector 1000B according to the seventh exemplary embodiment is a tri-laminar type projector that includes three liquid crystal display devices 400R, 400G, and 400B. As an illumination device for illuminating the liquid crystal display devices 400R, 400G, and 400B, the illumination device 100 and the scanning device 200 of the projector 1000A according to the first exemplary embodiment are used.

Accordingly, in the projector 1000B according to a seventh exemplary embodiment, in the same manner as the case of the projector 1000A according to the first exemplary embodiment, since the projector 1000B includes the scanning device 200 that scans the illumination luminous fluxes shaped into a cross-sectional shape compressed into the other direction by the superimposing lens 150 composed of the anamorphic optical system so as to illuminate all of an image formation regions of liquid crystal display devices 400R, 400G, and 400B in one direction along a transverse direction, and a part of the image formation regions in the other direction along a longitudinal direction, in synchronism with a field frequency of the liquid crystal display devices 400R, 400G, and 400B along the other direction on the image formation region, a projector is obtained in which a light irradiated region and a light non-irradiated region are sequentially and alternately scrolled in an image formation region of the liquid crystal display devices 400R, 400G, and 400B. As a result, a tailing phenomenon decreases to obtain a projector having a smooth motion picture display with a high quality.

Further, according to the projector 1000B of the seventh exemplary embodiment, since an illumination luminous flux having the cross-sectional shape that is compressed into the another direction as described above is realized by a light shaping phenomenon of the superimposing lens 150 composed of the anamorphic optical system, the illumination luminous flux from the second lens array 130 is surely guided to each image formation region of liquid crystal display devices 400R, 400G, and 400B. Thus, the projector 10001B reduces or prevents the utilization efficiency of light from being significantly reduced.

For this reason, the projector, according the seventh exemplary embodiment, provides a smooth motion picture display with high quality without largely reducing the utilization efficiency of light.

[Eight Exemplary Embodiment]

Figure 8:
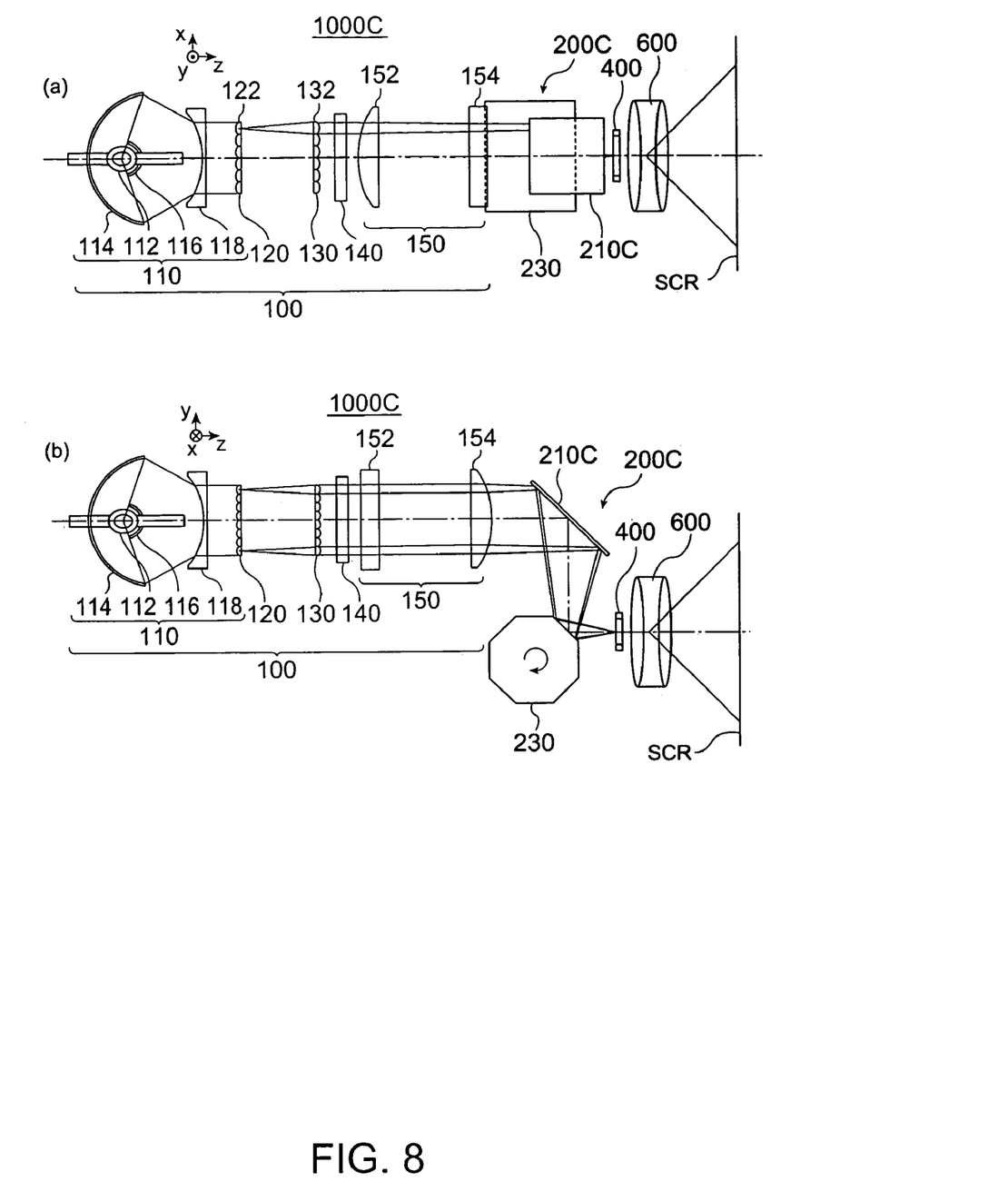
FIGS. 8(a) and 8(b) are schematics showing an optical system of a projector according to an eighth exemplary embodiment of the present invention.

FIGS. 8(a) and 8(b) are schematics showing an optical system of a projector according to an eighth exemplary embodiment of the present invention. FIG. 8(a) is a plan view schematic of the optical system, and FIG. 8(b) is a side view schematic of the optical system. In a projector 1000C according to the eighth exemplary embodiment, as shown in FIGS. 8(a) and 8(b), a scanning device 200C, including a reflecting mirror 210C and a polygon mirror 230, is substituted for the scanning device 200 of the projector 1000A, according to the first exemplary embodiment. The mirror 210C is the same with the mirror 210 shown in FIGS. 1(a) and 1(b) in the first exemplary embodiment. The scanning device 200C scans an illumination luminous flux on the liquid crystal device 400 by rotating the polygon mirror 230 as arrows shown in FIG. 8(b). The polygon mirror rotates on the x-axis. The rotational speed is controlled according to the field frequency of the liquid crystal display 400.

The configuration of a projector 1000C according to the eighth exemplary embodiment is different from that of the projector 1000A according to the first exemplary embodiment. However, in the same manner as the case of the projector 1000A according to the first exemplary embodiment, since the projector 1000C includes the scanning device 200C that scans the illumination luminous fluxes shaped into a cross-sectional shape compressed into another direction by the superimposing lens 150 composed of the anamorphic optical system so as to illuminate all of an image formation regions of liquid crystal display device 400 in one direction along a transverse direction, and a part of the image formation regions in the other direction along a longitudinal direction, in synchronism with a field frequency of the liquid crystal display devices 400 along another direction on the image formation region, a projector is obtained in which light irradiated region and light non-irradiated region are sequentially and alternately scrolled in an image formation region of the liquid crystal display device 400. As a result, a tailing phenomenon decreases to obtain a projector having a smooth motion picture display with a high quality.

Furthermore, in accordance with the projector 1000C of the eighth exemplary embodiment, since an illumination luminous flux having the cross-sectional shape that is compressed into the another direction as described above is realized by the light shaping phenomenon of the superimposing lens 150 composed of the anamorphic optical system, the illumination luminous flux from the second lens array 130 is guided to an image formation region of a liquid crystal display device 400. It also reduces or prevents the utilization efficiency of light from being significantly reduced.

For this reason, the projector according the eighth embodiment exemplary provides a smooth motion picture display of high quality without largely reducing the utilization efficiency of light.

The exemplary embodiments of the present invention are not limited to the above-described arrangement and exemplary embodiments. Various changes may be made without departing from the spirit and scope of the presently described exemplary embodiments of the present invention. For example, the following exemplary embodiments are applicable as well.

Projectors 1000A to 1000C in each of the above-described exemplary embodiments are projection-type projectors. However, exemplary embodiments of the present invention can also be applied to a reflection-type projector. The "projection-type" projector means a type of projector in which an electro-optical modulator transmits a light as a light converting device like transmissive liquid crystal display device, whereas the "reflection-type" projector means a type of projector in which an electro-optical modulator reflects a light as a light converting device like a reflective liquid crystal display device. When the exemplary embodiments of the present invention are applied to the reflection-type projector, the same results as that of the projection-type projector can be obtained.

The projectors 1000A to 1000C according to the above-described exemplary embodiments use a liquid crystal display device as an electro-optical modulator, but the exemplary embodiments of the present invention is not limited thereto. For example, a device for modulating an incident light according to image formation information may be employed as an electro-optical modulator, a micro-mirror type optical modulator or the like. For example, a DMD (digital micro-mirror device) can be used as the micro-mirror type optical modulator.

What is claimed is:

1. A projector, comprising:
   a light source device to emit an illumination luminous flux substantially parallel to an illuminated region side;
   a first lens array having a plurality of small lenses to separate the illumination luminous flux from the light source device into a plurality of partial luminous fluxes;
   a second lens array having a plurality of small lenses corresponding to the plurality of small lenses of the first lens array;

a superimposing lens to superimpose respective partial luminous fluxes from the second lens array on an illuminated region;

an electro-optical modulator to modulate the luminous fluxes superimposed by the superimposing lens according to image information; and a projective optical system to project the luminous fluxes modulated by the electro-optical modulator, the superimposing lens including an anamorphic optical system to shape the illumination luminous fluxes from the second lens array into illumination luminous fluxes having a cross-sectional shape so as to illuminate all of image formation regions of the electro-optical modulator in one of longitudinal and transverse directions, and a part of the image formation regions in another direction thereof; and the projector further including a scanning device to scan the illumination luminous fluxes shaped by the superimposing lens in synchronism with a-field frequency of the electro-optical modulator along the other direction on the image formation region, the superimposing lens including a first cylindrical lens having a bus line along the other direction and a second cylindrical lens having a bus line along the one direction, the first cylindrical lens including a first tandem optical system group including a plurality of tandem optical systems together with the plurality of small lenses of the second lens array, the second cylindrical lens including a second tandem optical system group including a plurality of tandem optical systems together with the plurality of small lenses of the second lens array, the first tandem optical system group and the second tandem optical system group having different magnifications from each other, and the magnification of an image formation region of the first tandem optical system group being set greater than that of an image formation region of the second tandem optical system group.

2. The projector according claim 1, the second cylindrical lens being rotatable about an illumination optical axis.

3. The projector according to claim 1, each of the first and second cylindrical lenses being a tablet.

4. The projector according to claim 1, the scanning device including a galvano-mirror or a polygon mirror.

5. The projector according to claim 1, the light source device including an ellipsoid reflector, an arc tube having a light emitting center in the vicinity of a first focus of the ellipsoid reflector, and a collimating lens for converting a luminous flux from the ellipsoid reflector into a substantially parallel luminous flux.

6. The projector according to claim 5, the arc tube being provided with a reflecting device to reflect a light emitted to an illuminated region side from the arc tube toward the ellipsoid reflector or the paraboloid reflector.

7. The projector according to claim 1, the light source device including a paraboloid reflector and an arc tube having a light emitting center in the vicinity of a focus of the paraboloid reflector.

8. The projector according to claim 1, a polarization converting element being provided between the second lens array and the superimposing lens, to convert the illumination luminous fluxes from the second lens array into illumination luminous fluxes, each having a polarization axis of a predetermined direction.

9. A projector, comprising:

a light source device to emit an illumination luminous flux substantially parallel to an illuminated region side;

a first lens array having a plurality of small lenses to separate the illumination luminous flux from the light source device into a plurality of partial luminous fluxes;

a second lens array having a plurality of small lenses corresponding to the plurality of small lenses of the first lens array;

a superimposing lens to superimpose respective partial luminous fluxes from the second lens array on an illuminated region;

an electro-optical modulator to modulate the luminous fluxes superimposed by the superimposing lens according to image information; and a projective optical system to project the luminous fluxes modulated by the electro-optical modulator, the superimposing lens including an anamorphic optical system to shape the illumination luminous fluxes from the second lens array into illumination luminous fluxes having a cross-sectional shape so as to illuminate all of image formation regions of the electro-optical modulator in one of longitudinal and transverse directions, and a part of the image formation regions in another direction thereof; and the projector further including a scanning device to scan the illumination luminous fluxes shaped by the superimposing lens in synchronism with a field frequency of the electro-optical modulator along the other direction on the image formation region, the superimposing lens including a first cylindrical lens having a bus line along the other direction and a second cylindrical lens having a bus line along the one direction, the first cylindrical lens including a first tandem optical system group including a plurality of tandem optical systems together with the plurality of small lenses of the second lens array, the second cylindrical lens including a second tandem optical system group including a plurality of tandem optical systems together with the plurality of small lenses of the second lens array, the second cylindrical lens being rotatable about an illumination optical axis, and the first tandem optical system group and the second tandem optical system group having different magnifications from each other.

10. The projector according to claim 9, each of the first and second cylindrical lenses being a tablet.

11. The projector according to claim 9, the scanning device including a galvano-mirror or a polygon mirror.

12. The projector according to claim 9, the light source device including an ellipsoid reflector, an arc tube having a light emitting center in the vicinity of a first focus of the ellipsoid reflector, and a collimating lens for converting a luminous flux from the ellipsoid reflector into a substantially parallel luminous flux.

13. The projector according to claim 9, the light source device including a paraboloid reflector and an arc tube having a light emitting center in the vicinity of a focus of the paraboloid reflector.

14. The projector according to claim 12, the arc tube being provided with a reflecting device to reflect a light emitted to an illuminated region side from the arc tube toward the ellipsoid reflector or the paraboloid reflector.

15. The projector according to claim 9, a polarization converting element being provided between the second lens array and the superimposing lens, to convert the illumination luminous fluxes from the second lens array into illumination luminous fluxes, each having a polarization axis of a predetermined direction.

* * * * *